United States Patent
Gupta

(10) Patent No.: US 10,067,912 B2
(45) Date of Patent: Sep. 4, 2018

(54) SYSTEM TO FACILITATE MANAGEMENT OF HIGH-THROUGHPUT ARCHITECTURES

(71) Applicant: SAP SE, Walldorf (DE)

(72) Inventor: Vipul Gupta, Bangalore (IN)

(73) Assignee: SAP SE, Walldorf (DE)

( * ) Notice: Subject to any disclaimer, the term of this patent is extended or adjusted under 35 U.S.C. 154(b) by 110 days.

(21) Appl. No.: 15/272,655

(22) Filed: Sep. 22, 2016

(65) Prior Publication Data
US 2018/0081858 A1     Mar. 22, 2018

(51) Int. Cl.
*G06F 17/18*     (2006.01)

(52) U.S. Cl.
CPC ..................... *G06F 17/18* (2013.01)

(58) Field of Classification Search
CPC ....................................................... G06F 17/18
See application file for complete search history.

(56) References Cited

U.S. PATENT DOCUMENTS

| 9,065,727 B1* | 6/2015 | Liu | H04L 43/04 |
| 2008/0168339 A1* | 7/2008 | Hudson | G06F 11/10 |
| | | | 714/800 |

* cited by examiner

*Primary Examiner* — Bryan Bui
(74) *Attorney, Agent, or Firm* — Buckley, Maschoff & Talwalkar LLC

(57) ABSTRACT

Systems and methods include determination of a first data analysis period, determination of a first plurality of sets of parameter values, each of the first plurality of sets of parameter values being associated with a respective time period within the first data analysis period and describing a statistical distribution of data points associated with the respective time period, determination of a statistical distribution associated with the first data analysis period based on the first plurality of sets of parameter values, determination of a system condition based on the statistical distribution associated with the first data analysis period, and initiation of an action based on the determined system condition.

20 Claims, 7 Drawing Sheets

US 10,067,912 B2

1

SYSTEM TO FACILITATE MANAGEMENT OF HIGH-THROUGHPUT ARCHITECTURES

BACKGROUND

Enterprise computing systems execute many processes in order to perform various tasks. To effectively manage these computing systems, data relating to some or all of these processes is acquired, and performance metrics are calculated based on the acquired data. The performance metrics may facilitate the identification and resolution of issues which impact (or may soon impact) system performance.

It may be desired to calculate performance metrics over various historical time periods (e.g., over the last 5 minutes and the last 30 minutes). The performance-related data points associated with each time period are selected and performance metrics for each time period are calculated based on the selected data points. Conventionally, these calculations require storage of all historical performance-related data points. In view of the velocity of transactions executed by current computing systems, this approach is neither scalable nor cost-efficient.

DETAILED DESCRIPTION

The following description is provided to enable any person in the art to make and use the described embodiments. Various modifications, however, will remain readily apparent to those in the art.

As a brief non-exhaustive introduction to some embodiments, performance-related data points may be collected over a first time period. For example, the data points may represent the execution times of each search query which was executed by a database system during the specified time period. Next, a representative sample of the data points is generated using one or more suitable algorithms. The representative sample exhibits a mathematical distribution which is substantially similar to the mathematical distribution of the full set of data points. Characteristics of the mathematical distribution of the representative sample (e.g., count, mean, percentile, meanRate, and variance) are then determined and stored in conjunction with an identifier of the first time period.

The above process is performed for each successive time period. For example, in a case that the time periods are five minutes in length, then six sets of mathematical distribution characteristics, or metrics objects, are determined for each thirty-minute time period. These six metrics objects may be used as described below to determine distributions of data points associated with various sub-periods of the prior thirty-minute time period such as, for example, the entire thirty-minute period and the most-recent ten-minute period. A performance metric may then be calculated for each of these two sub-periods based on the determined distributions. Since the metrics objects occupy a small fraction of the memory space of the data points which they represent, some embodiments of the foregoing may provide a scalable and efficient system to calculate performance metrics (or any other metric) for various time periods and sub-periods which would otherwise require storage of large amounts of data.

Figure 1:
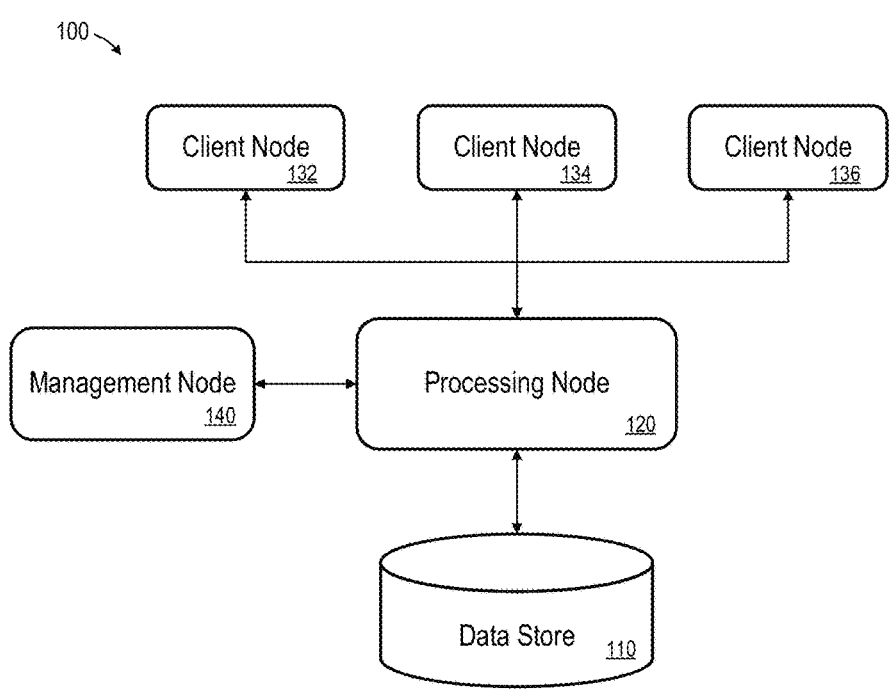
FIG. 1 is a block diagram of a system architecture according to some embodiments.

FIG. 1 is a block diagram of architecture 100 according to some embodiments. Architecture 100 generally represents a multi-client processing architecture, where processing node 120 may provide any service or services to client nodes 132, 134 and 136. The services may be provided based on data stored in data store 110. According to some embodiments, processing node 120 receives search queries from client nodes 132, 134 and 136 and provides results thereto based on data stored in data store 110.

Processing node 120 and data store 110 may be cloud-based and each may itself consist of a distributed architecture. Processing node 120 and data store 110 may support multi-tenancy to separately support multiple unrelated clients by providing multiple logical database systems which are programmatically isolated from one another. In some embodiments, the data of data store 110 may comprise one or more of conventional tabular data, row-based data, column-based data, and object-based data. Moreover, the data may be indexed and/or selectively replicated in an index to allow fast searching and retrieval thereof.

Management node 140 may operate to monitor processing node 120. Such monitoring may comprise monitoring performance metrics such as up-time, response time, etc. Management node 140 may change parameters and/or a configuration of processing node 120 based on this monitoring, according to some embodiments. For example, in a case that processing node 120 comprises a cluster of servers, management node 140 may determine, based on performance metrics, that one of the servers is exhibiting signs of imminent failure. In response, management node 140 may transfer the workload of the failing server to one or more other servers in the cluster (or to a new server) and shutdown the failing server.

Figure 2:
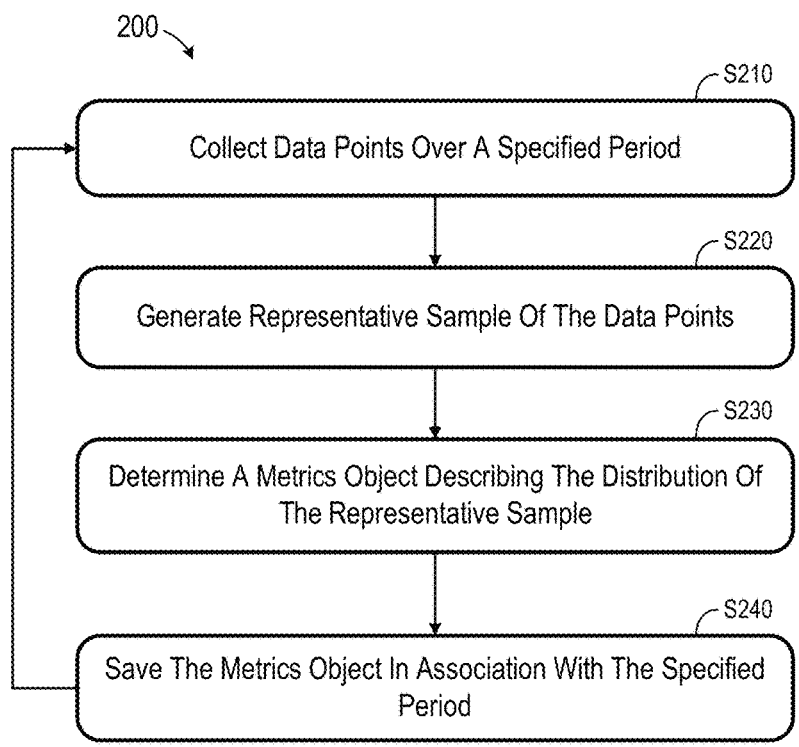
FIG. 2 comprises a flow diagram of process steps according to some embodiments.

FIG. 2 comprises a flow diagram of process 200 according to some embodiments. In some embodiments, one or more hardware processing units of management node 140 of system 100 executes program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Data points are collected over a specified period at S210. The data points may comprise any data points from which a performance metric (or any other metric) associated with the period may be calculated. Each data point may include any type of data and may include multiple data fields (i.e., a tuple). According to one non-exhaustive example, the data points comprise execution times for each query executed (i.e., served) by processing node 120 during a five-minute time period.

The data points may be transmitted by processing node 120 to management node 140 and collected thereby at S210. According to alternative embodiments, the data points are stored at processing node 120. In a case that processing node comprises a cluster and/or a set of distributed nodes, the data points generated by each cluster/node may be stored on their respective cluster/node.

Figure 3A:
FIG. 3A illustrates a stored data point according to some embodiments.
Figure 3B:
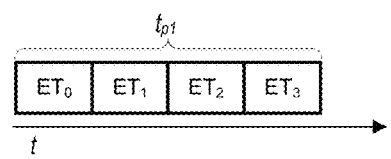
FIG. 3B illustrates stored data points according to some embodiments.
Figure 3C:
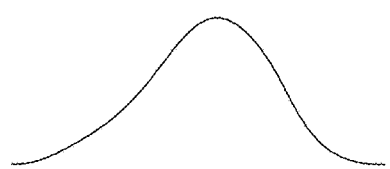
FIG. 3C illustrates a distribution of data points according to some embodiments.

FIG. 3A illustrates a collected data point according to some embodiments. The data point $ET_0$ represents an amount of time required to execute a query. As time passes during the specified period $t_{p1}$, additional data points $ET_1$, $ET_2$, and $ET_3$ are collected as shown in FIG. 3B, each of which represents an amount of time required to execute an associated query. FIG. 3C illustrates a statistical distribution of the collected data points.

Figure 3D:
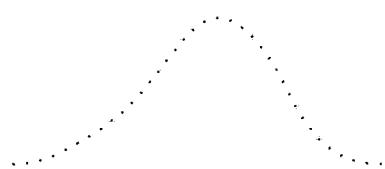
FIG. 3D illustrates a distribution of a representative sample of data points according to some embodiments.

Next, a representative sample of the data points is generated at S220. As described above, the generated representative sample may exhibit a statistical distribution which is substantially similar to the statistical distribution of the full set of data points collected at S210. FIG. 3D illustrates a representation of the statistical distribution of the representative sample generated from the FIG. 3C data points according to some embodiments.

According to some embodiments, Vitter's Algorithm R is used at S220 to generate a statistically representative sample of the collected data points. Algorithm R may consist of the following steps (assuming k<s and using one-based array indexing):

```
// S has items to sample, R will contain the result
ReservoirSample(S[1..n], R[1..k])
    // fill the reservoir array
    for i = 1 to k
        R[i] := S[i]
    // replace elements with gradually decreasing probability
    for i = k+1 to n
        j := random(1, i)      // important: inclusive range
        if j <= k
            R[j] := S[i]
```

The algorithm creates a "reservoir" array of size k and populates it with the first k items of S. It then iterates through the remaining elements of S until S is exhausted. At the $i^{th}$ element of S, the algorithm generates a random number j between 1 and i. If j is less than or equal to k, the $j^{th}$ element of the reservoir array is replaced with the $i^{th}$ element of S. In effect, for all i, the $i^{th}$ element of S is chosen to be included in the reservoir with probability k/i. Similarly, at each iteration the $j^{th}$ element of the reservoir array is chosen to be replaced with probability 1/k*k/i, which simplifies to 1/i. After completion of the algorithm, each item in S (i.e., the representative sample of data points) has equal probability (i.e., k/length(S)) of being chosen for the reservoir. The collected data points which do not belong in S may be discarded after S220, thereby freeing up storage space.

A metrics object is determined at S230. The metrics object includes values of parameters describing the statistical distribution of the representative sample of data points. Such parameters may include, for example, a count, a mean, a percentile, a meanRate, and a variance. Calculation of values of these parameters based on a set of data points is known in the art.

Figure 3E:
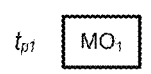
FIG. 3E illustrates a stored metrics object according to some embodiments.
Figure 4:
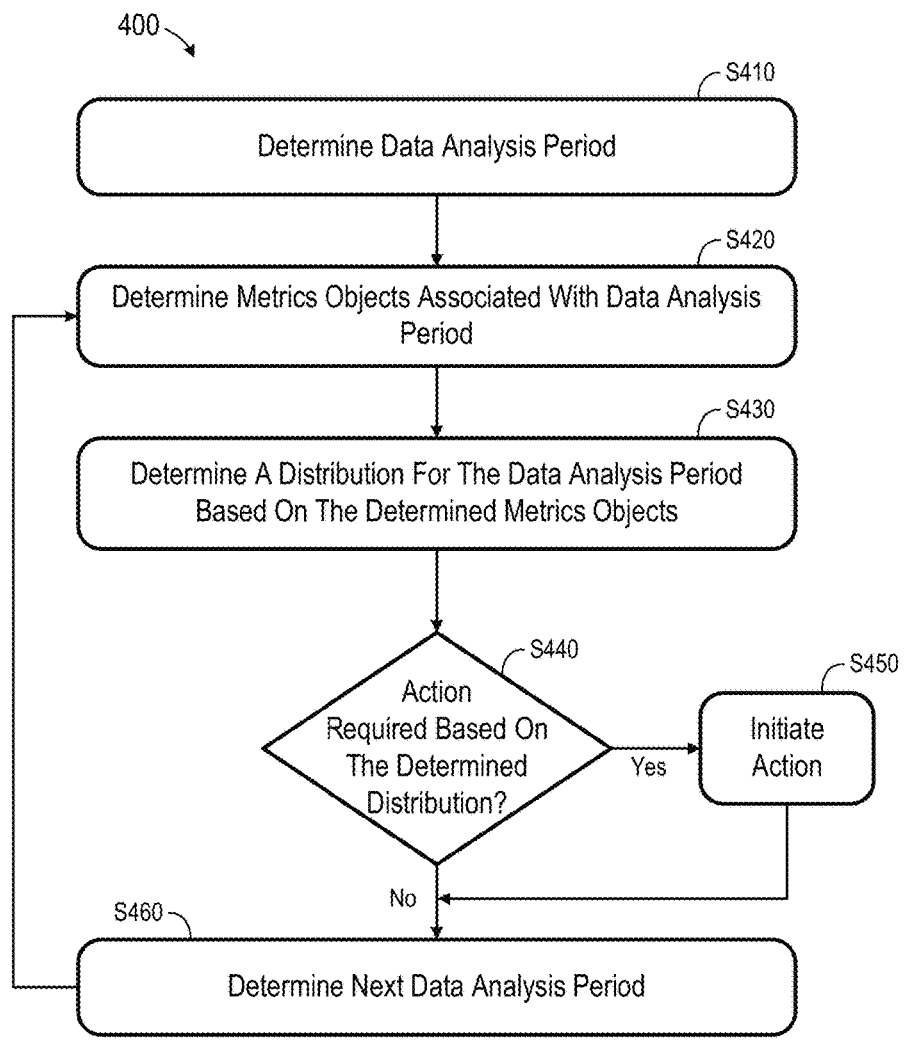
FIG. 4 comprises a flow diagram of process steps according to some embodiments.

The metrics object is stored in association with the specified period at S240. FIG. 3E illustrates storage of metrics object $MO_1$ in association with an identifier of time period $t_{p1}$ according to some embodiments. The identifier may comprise an index or key to the metrics object. The metrics object may be stored at management node 140 and/or at a processing server/node which generated the data based on which the metrics object was determined.

Flow returns from S240 to S210 to collect data points over a next specified period. Since the performance information provided by the data points collected at S210 has been efficiently encapsulated into the stored metrics object alone, the representative sample of data points may be discarded after S240.

Process 200 may be performed by multiple threads simultaneously, with each of the multiple threads responsible for data points of a respective specified period. For example, while a first thread is determining a metrics object for a specified period based on a representative sample data points, a second thread may be collecting data points over a next specified period.

Process 400 may be executed to determine a statistical distribution of data for an analysis period based on the stored metrics objects. The data analysis period is determined at S410. For example, management node 140 may be configured to continuously track a performance metric over the prior five minutes and the prior thirty minutes. Alternatively, an administrator of processing node 120 may request a value of the performance metric over a different prior period.

Figure 5A:
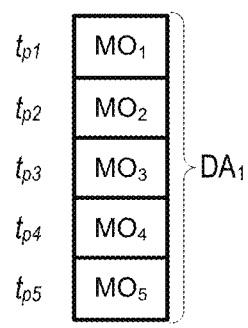
FIG. 5A illustrates stored metrics objects according to some embodiments.

At S420, metrics objects associated with the data analysis period are determined. FIG. 5A illustrates five last-stored metrics objects, each of which is associated with one of five prior and successive five-minute periods $t_{p1}$-$t_{p5}$. It will be assumed that the data analysis period $DA_1$ determined at S410 is twenty-five minutes. Accordingly, each of metrics objects $MO_1$-$MO_5$ is determined at S420.

A statistical distribution for the data analysis period is determined at S430 based on the determined metrics objects. As described above, each metrics object describes the statistical distribution of data associated with its respective time period. According to some embodiments, each of these descriptions is used at S430 to generate a description of a statistical distribution of data associated with the entire data analysis period.

For example, the aggregate "count" associated with the statistical distribution of the data analysis period is determined as the sum of all the counts of each determined metrics object. The aggregate "mean" associated with the statistical distribution of the data analysis period is determined by calculating the product of "count" and "mean" for each metrics object. These products are summed and then divided by the total number of counts of all the determined metrics objects.

The aggregate "percentile" associated with the statistical distribution of the data analysis period may be determined as the maximum percentile of the determined metrics objects according to some embodiments. Alternatively, the aggregate percentile is determined as a range of possible values. For example, the aggregate median (or other n-th percentile) may be determined to simply be between the lowest median (or n-th percentile) and the highest median (or n-th percentile) of all of the determined metrics objects.

The aggregated variance of the composite statistical distribution is computed as follows according to some embodiments, where m is the sample size of one group, n is the sample size of the other group and $x_i$ are the data:

Use the definitions of mean $$\mu_{1:n} = \frac{1}{n}\sum_{i=1}^{n} x_i$$

and sample variance $$\sigma_{1:n}^2 = \frac{1}{n}\sum_{i=1}^{n}(x_i - \mu_{1:n})^2 = \frac{n-1}{n}\left(\frac{1}{n-1}\sum_{i=1}^{n}(x_i - \mu_{1:n})^2\right)$$

(the last term in parentheses is the unbiased variance estimator often computed by default in statistical software) to find the sum of squares of all the data $x_j$. Let's order the indexes i so that i=1, . . . , n designates elements of the first group and i=n+1, . . . , n+m designates elements of the second group. Break that sum of squares by group and re-express the two pieces in terms of the variances and means of the subsets of the data:

$$(m+n)(\sigma_{1:m+n}^2 + \mu_{1:m+n}^2) = \sum_{i=1}^{1:n+m} x_i^2$$
$$= \sum_{i=1}^{n} x_i^2 + \sum_{i=n+1}^{n+m} x_i^2$$
$$= n(\sigma_{1:n}^2 + \mu_{1:n}^2) + m(\sigma_{1+n:m+n}^2 + \mu_{1+n:m+n}^2).$$

Algebraically solving this $\sigma_{m+n}^2$ in terms of the other (known) quantities yields $$\sigma_{1:m+n}^2 = \frac{n(\sigma_{1:n}^2 + \mu_{1:n}^2) + m(\sigma_{1+n:m+n}^2 + \mu_{1+n:m+n}^2)}{m+n} - \mu_{1:m+n}^2.$$

Of course using the same approach, $\mu_{1:m+n}=(n\mu_{1:n}+m\mu_{1+n:m+n})/(m+n)$ can be expressed in terms of the group means, too.

Figure 6:
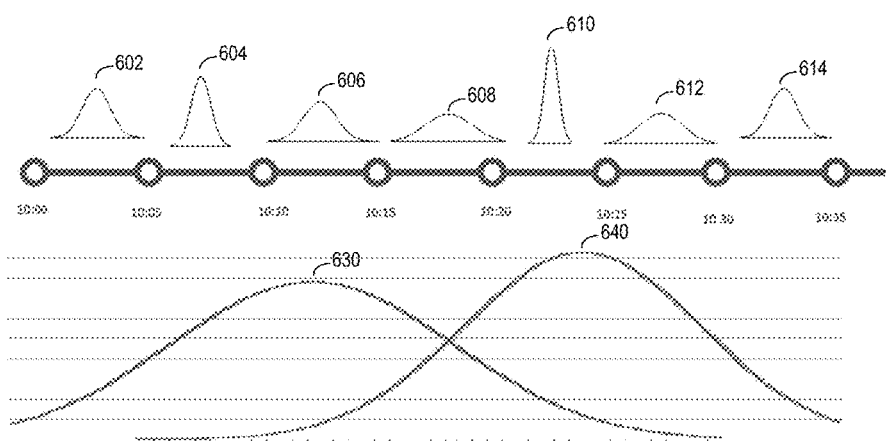
FIG. 6 illustrates determination of composite distributions according to some embodiments.

FIG. 6 illustrates a distribution determined at S430 according to some embodiments. Distributions 602 through 612 represent data points collected during one of six respective five-minute time periods. Each of distributions 602 through 612 is described by a respective metrics object. These descriptions are used to determine values describing distribution 630, which is associated with the time period between 10:00 and 10:30. Accordingly, distribution 630 is a representation of all data points collected between 10:00 and 10:30.

Returning to process 400, management node 140 may determine at S440 whether an action is required based on the determined distribution. For example, the values of the parameters describing the distribution may indicate poor performance or a failing node. Actions may include, but are not limited to, allocating more resources (e.g., memory, processor cycles) to a particular process, replacing a processing node with another processing node, re-distributing workloads among processing nodes, etc. Management node 140 may include rules for determining whether an action is required based on a statistical distribution of data points representing a particular performance-related parameter. If the determination at S440 is affirmative, flow proceeds to S450 to initiate the action.

Flow may continue to S460 from S440 or S450. A next analysis period is determined at S460 and flow returns to S420 and continues as described above with respect to the next data analysis period. Continuing the present example, it will be assumed that the next data analysis period is the next twenty-five minute period for which metrics objects have been generated.

Figure 5B:
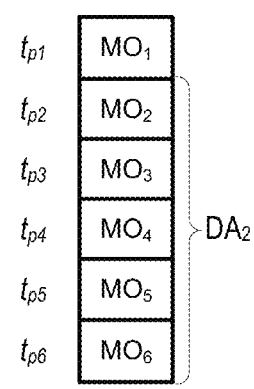
FIG. 5B illustrates stored metrics objects according to some embodiments.

FIG. 5B illustrates data analysis period $DA_2$. Period $DA_2$ is defined by a sliding window includes new metrics object $MO_6$ associated with time period $tp_6$, and omits metrics object $MO_1$ associated with time period $tp_1$. Metrics objects $MO_2$-$MO_6$ are therefore used at S430 to determine a distribution associated with the twenty-five minute period associated with time periods $tp_1$-$tp_6$.

FIG. 6 illustrates distribution 640 which is determined using a sliding window as described with respect to FIG. 5B. Distribution 614 represents data points collected during a last five-minute time period, and is described by a respective metrics object. The descriptions of distributions 604 through 614 are therefore used to determine values describing distribution 640, which is associated with the time period between 10:05 and 10:35. Accordingly, distribution 640 is a representation of all data points collected between 10:05 and 10:35.

Figure 7:
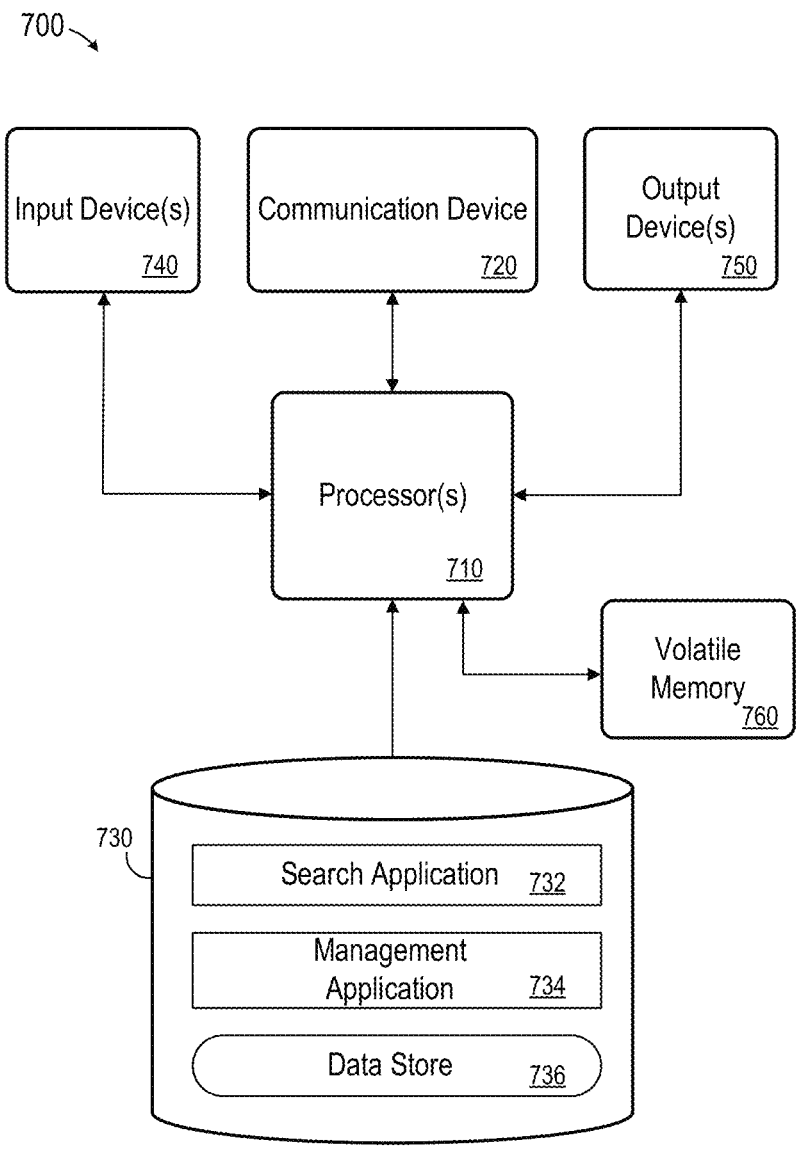
FIG. 7 is a block diagram of a computing system according to some embodiments.

FIG. 7 is a block diagram of apparatus 700 according to some embodiments. Apparatus 700 may comprise a general-purpose computing apparatus and may execute program code to perform any of the functions described herein. Apparatus 700 may comprise an implementation of processing node 120, management node 140, and data store 110 of FIG. 1 in some embodiments. Apparatus 700 may include other unshown elements according to some embodiments.

Apparatus 700 includes processor(s) 710 operatively coupled to communication device 720, data storage device 730, one or more input devices 740, one or more output devices 750 and memory 760. Communication device 720 may facilitate communication with external devices, such as a reporting client, or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM), Storage Class Memory (SCM) or any other fast-access memory.

Search application 732 and management application 734 may comprise program code executed by processor 710 to cause apparatus 700 to perform any one or more of the processes described herein. Data store 736 may comprise enterprise data as well as data points and metrics objects as described herein. Embodiments are not limited to execution of these processes by a single apparatus.

Data store 736 may be stored in volatile memory such as memory 760. Data storage device 730 may also store data and other program code for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising
a memory storing processor-executable process steps; and
one or more processors to execute the processor-executable process steps to:
determine a first data analysis period, the first data analysis period being associated with a first period of time of collecting a first set of data points;
determine a first plurality of sets of parameter values, each of the first plurality of sets of parameter values being associated with a respective time period within the first data analysis period and describing a statistical distribution of data points associated with the respective time period;
represent each of the first plurality of sets of parameter values as a first metrics object, the first metrics objects being a data structure including values of parameters describing the statistical distribution of data points associated with each of the respective time periods and an identifier of the respective time period within the first data analysis period;
store the first metrics objects representing the respective time periods within the first data analysis period in a data store;
determine a statistical distribution associated with the first data analysis period based on the stored first metrics objects representing the respective time periods within the first data analysis period;
determine whether to invoke a system action based on the statistical distribution associated with the first data analysis period; and
initiate, in the instance it is determined that a system action is to be invoked based on the statistical distribution associated with the first data analysis period, the system action for a system associated with the collected a plurality of data points.

2. The system according to claim 1, wherein determination of a statistical distribution associated with the first data analysis period based on the stored metrics objects representing the respective time periods comprises:
determination of a set of aggregated parameter values based on the stored metrics objects representing the respective time periods.

3. The system according to claim 1, the one or more processors to further execute processor-executable process steps to:
determine a second data analysis period, the second data analysis period being associated with a second period of time of collecting a second set of data points and different than the first data analysis period;
determine a second plurality of sets of parameter values, each of the second plurality of sets of parameter values being associated with a respective time period within the second data analysis period and describing a statistical distribution of data points associated with the respective time period;
represent each of the second plurality of sets of parameter values as a second metrics object, the second metrics objects being a data structure including values of parameters describing the statistical distribution of data points associated with each of the respective time periods within the second data analysis period and an identifier of the respective time period within the second data analysis period;
store the second metrics objects representing the respective time periods within the second data analysis period; and
determine a second statistical distribution associated with the second data analysis period based on the stored second metrics objects representing the respective time periods within the second data analysis period,
wherein the determination of whether to invoke a system action is based on the statistical distribution associated with the first data analysis period and on the second statistical distribution associated with the second data analysis period.

4. The system according to claim 3, wherein:
determination of a statistical distribution associated with the first data analysis period based on the stored metrics objects representing the respective time periods within the first data analysis period comprises determination of a set of aggregated parameter values based on the metrics objects representing the respective time periods within the first data analysis period; and
determination of a second statistical distribution associated with the second metrics objects representing the respective time periods within the second data analysis period comprises determination of a second set of aggregated parameter values based on the second plurality of metrics objects representing the respective time periods within the second data analysis period.

5. The system according to claim 1, the one or more processors to further execute processor-executable process steps to:
collect the first set of data points over the first period of time, the first set of data points exhibiting a first statistical distribution;

generate a sample of the first set of data points, the sample of the first set of data points exhibiting a second statistical distribution substantially similar to the first statistical distribution;

determine first parameter values describing the second statistical distribution;

represent the first parameter values as a third metrics object, the third metrics object being a data structure including values of parameters describing the second statistical distribution of data points associated with the first period of time; and store the first metrics object in association with the first time period.

6. The system according to claim 5, the one or more processors to further execute processor-executable process steps to:

collect a second set of data points over a second time period, the second set of data points exhibiting a third statistical distribution;

generate a sample of the second set of data points, the sample of the second set of data points exhibiting a fourth statistical distribution substantially similar to the third statistical distribution;

determine second parameter values describing the fourth statistical distribution;

represent the second parameter values as a fourth metrics object, the fourth metrics object being a data structure including values of parameters describing the fourth statistical distribution of data points associated with the second period of time; and store the fourth metrics object in association with the second time period.

7. The system according to claim 5, the one or more processors to further execute processor-executable process steps to:

discard the first set of data points and the sample of the first set of data points in response to the storing of the third metric objects.

8. The system according to claim 1, wherein the stored first metrics objects representing the respective time periods within the first data analysis period indicate a system performance.

9. A non-transitory computer-implemented method comprising:

determining a first data analysis period, the first data analysis period being associated with a first period of time of collecting a first set of data points;

determining a first plurality of sets of parameter values, each of the first plurality of sets of parameter values being associated with a respective time period within the first data analysis period and describing a statistical distribution of data points associated with the respective time period;

representing each of the first plurality of sets of parameter values as a first metrics object, the first metrics objects being a data structure including values of parameters describing the statistical distribution of data points associated with each of the respective time periods and an identifier of the respective time period within the first data analysis period;

storing the first metrics objects representing the respective time periods within the first data analysis period in a data store;

determining a statistical distribution associated with the first data analysis period based on the stored first metrics objects representing the respective time periods within the first data analysis period;

determining whether to invoke a system action based on the statistical distribution associated with the first data analysis period; and initiating, in the instance it is determined that the system action is to be invoked based on the statistical distribution associated with the first data analysis period, the system action for a system associated with the collected a plurality of data points.

10. The method according to claim 9, wherein determining a statistical distribution associated with the first data analysis period based on the stored metrics objects representing the respective time periods comprises:

determining a set of aggregated parameter values based on the stored metrics objects representing the respective time periods.

11. The method according to claim 9, further comprising:

determining a second data analysis period, the second data analysis period being associated with a second period of time of collecting a second set of data points and different than the first data analysis period;

determining a second plurality of sets of parameter values, each of the second plurality of sets of parameter values being associated with a respective time period within the second data analysis period and describing a statistical distribution of data points associated with the respective time period;

representing each of the second plurality of sets of parameter values as a second metrics object, the second metrics objects being a data structure including values of parameters describing the statistical distribution of data points associated with each of the respective time periods within the second data analysis period and an identifier of the respective time period within the second data analysis period;

storing the second metrics objects representing the respective time periods within the second data analysis period; and determining a second statistical distribution associated with the second data analysis period based on the stored second metrics objects representing the respective time periods within the second data analysis period, wherein the determining of whether to invoke a system action is based on the statistical distribution associated with the first data analysis period and on the second statistical distribution associated with the second data analysis period.

12. The method according to claim 11, wherein determining a statistical distribution associated with the first data analysis period based on the stored metrics objects representing the respective time periods within the first data analysis period comprises:

determining a set of aggregated parameter values based on the metrics objects representing the respective time periods within the first data analysis period, and determining a second statistical distribution associated with the second metrics objects representing the respective time periods within the second data analysis period comprises:

determining a second set of aggregated parameter values based on the metrics objects representing the respective time periods within the second data analysis period.

13. The method according to claim 9, further comprising:

collecting the first set of data points over the first period of time, the first set of data points exhibiting a first statistical distribution;

generating a sample of the first set of data points, the sample of the first set of data points exhibiting a second statistical distribution substantially similar to the first statistical distribution;

determining first parameter values describing the second statistical distribution;

representing the first parameter values as a third metrics object, the third metrics object being a data structure including values of parameters describing the second statistical distribution of data points associated with the first period of time storing the first metrics object in association with the first time period.

14. The method according to claim 13, the one or more processors to further execute processor-executable process steps to:

collecting a second set of data points over a second time period, the second set of data points exhibiting a third statistical distribution;

generating a sample of the second set of data points, the sample of the second set of data points exhibiting a fourth statistical distribution substantially similar to the third statistical distribution;

determining second parameter values describing the fourth statistical distribution;

representing the second parameter values as a fourth metrics object, the fourth metrics object being a data structure including values of parameters describing the fourth statistical distribution of data points associated with the second period of time; and storing the fourth metrics object in association with the second time period.

15. The method according to claim 13, the one or more processors to further execute processor-executable process steps to:

discarding the first set of data points and the sample of the first set of data points in response to the storing of the third metric objects.

16. The method according to claim 9, wherein the stored first metrics objects representing the respective time periods within the first data analysis period indicate a particular system performance.

17. A non-transitory computer readable medium storing process steps executable by a processor to:

determine a first data analysis period, the first data analysis period being associated with a first period of time of collecting a first set of data points;

determine a first plurality of sets of parameter values, each of the first plurality of sets of parameter values being associated with a respective time period within the first data analysis period and describing a statistical distribution of data points associated with the respective time period;

represent each of the first plurality of sets of parameter values as a first metrics object, the first metrics objects being a data structure including values of parameters describing the statistical distribution of data points associated with each of the respective time periods and an identifier of the respective time period within the first data analysis period;

store the first metrics objects representing the respective time periods within the first data analysis period in a data store;

determine a statistical distribution associated with the first data analysis period based on the stored first metrics objects representing the respective time periods within the first data analysis period;

determine whether to invoke a system action based on the statistical distribution associated with the first data analysis period; and initiate, in the instance it is determined that the system action is to be invoked based on the statistical distribution associated with the first data analysis period, the system action for a system associated with the collected a plurality of data points.

18. The medium according to claim 17, wherein determination of a statistical distribution associated with the first data analysis period based on the stored metrics objects representing the respective time periods comprises:

determination of a set of aggregated parameter values based on the stored metrics objects representing the respective time periods.

19. The medium according to claim 17, the process steps further executable by a processor to:

determine a second data analysis period, the second data analysis period being associated with a second period of time of collecting a second set of data points and different than the first data analysis period;

determine a second plurality of sets of parameter values, each of the second plurality of sets of parameter values being associated with a respective time period within the second data analysis period and describing a statistical distribution of data points associated with the respective time period;

represent each of the second plurality of sets of parameter values as a second metrics object, the second metrics objects being a data structure including values of parameters describing the statistical distribution of data points associated with each of the respective time periods within the second data analysis period and an identifier of the respective time period within the second data analysis period;

store the second metrics objects representing the respective time periods within the second data analysis period; and determine a second statistical distribution associated with the second data analysis period based on the stored second metrics objects representing the respective time periods within the second data analysis period, wherein the determination of whether to invoke a system action is based on the statistical distribution associated with the first data analysis period and on the second statistical distribution associated with the second data analysis period.

20. The medium according to claim 17, the process steps further executable by a processor to:

collect the first set of data points over the first period of time, the first set of data points exhibiting a first statistical distribution;

generate a sample of the first set of data points, the sample of the first set of data points exhibiting a second statistical distribution substantially similar to the first statistical distribution;

determine first parameter values describing the second statistical distribution;

represent the first parameter values as a third metrics object, the third metrics object being a data structure including values of parameters describing the second statistical distribution of data points associated with the first period of time; and store the first metrics object in association with the first time period.

* * * * *